United States Patent [19]
Tye

[11] Patent Number: 6,055,365
[45] Date of Patent: Apr. 25, 2000

[54] CODE POINT TRANSLATION FOR COMPUTER TEXT, USING STATE TABLES

[75] Inventor: Timothy T. Tye, Wylie, Tex.

[73] Assignee: Sterling Software, Inc., Dallas, Tex.

[21] Appl. No.: 08/963,891

[22] Filed: Nov. 4, 1997

Related U.S. Application Data

[60] Provisional application No. 60/029,744, Nov. 8, 1996.

[51] Int. Cl.$^7$ ..................................................... G06F 9/445
[52] U.S. Cl. ........................... 395/500.02; 717/1; 717/2; 717/3; 717/5; 717/6; 717/7
[58] Field of Search .................................. 717/1, 2, 3, 4, 717/5, 6, 7

[56] References Cited

U.S. PATENT DOCUMENTS

| | | | |
|---|---|---|---|
| 5,231,689 | 7/1993 | Forcier | 707/541 |
| 5,257,351 | 10/1993 | Leonard et al. | 707/542 |
| 5,321,810 | 6/1994 | Case et al. | 345/515 |
| 5,337,233 | 8/1994 | Hofert et al. | 707/540 |
| 5,450,595 | 9/1995 | Chen et al. | 707/1 |
| 5,590,257 | 12/1996 | Forcier et al. | 707/530 |
| 5,664,027 | 9/1997 | Ittner | 382/170 |
| 5,748,783 | 5/1998 | Rhoads | 382/232 |
| 5,765,006 | 6/1998 | Motoyama | 707/514 |
| 5,781,714 | 7/1998 | Collins et al. | 345/471 |
| 5,895,478 | 4/1999 | Pollard | 707/519 |

OTHER PUBLICATIONS

IBM Technical Disclosure Bulletin, "Character by Character Display, Shading of Displayed Graphics", vol. 26, No. 10A, pp. 4934–4938, Mar. 1984.
IBM Technical Disclosure Bulletin, "Many Dimension Visualization Technique", vol. 35, No. 6, pp. 473–475, Nov. 1992.
Gross, "Recognizing and Interpreting Diagrams in Design", ACM transaction, pp. 88–94, Jun. 1994.
Chuah et al., "Managing Software with New Visual Representations", IEEE, pp. 30–37, 118, Oct. 1997.
Rohrer et al., "A Shape–based Visual interface for Text Retreival", IEEE, pp. 40–46, Oct. 1999.
"National Language Design Guide," *National Language Support Reference Manual*, vol. 2, pp. 143–144, 177–198, I–240, I–251, I–254, I–258, K–409–K–444, IBM © 1994.
"Unicode 2.1," *Unicode, Inc.*, pp. 1–6, 1992–1993.
"American National Standard for Information Processing—8–Bit Single–Byte Coded Graphic Character Sets—Part 1: Latin Alphabet No. 2," *ANSI American National Standards Institute*, pp. 1–8, Information Technology Industry Council (ITI) © 1987.
"Information Processing—8–Bit Single–Byte Coded Graphic Character Sets—Parts 6: Latin/Arabic Alphabet," *International Standard*, ISO 8859–6, First Edition, pp. 1–5, Internation Organization For Standardization (ISO) © 1987.
"Information Processing—ISO 7–Bit and 8–Bit Coded Character Sets—Code Extension Techniques," *International Standard*, ISO 2022, Third Edition, pp. 1–25, 1986.
"Webdesk—ASCII (American Standard Code for Information Interchange) Table," pp. 1–2.

*Primary Examiner*—Tariq R. Hafiz
*Assistant Examiner*—Ted T. Vo
*Attorney, Agent, or Firm*—Baker Botts L.L.P.

[57] ABSTRACT

A method of using a computer (11) to translate a source text file (10) to a destination text file (15). The source text file (11) is written with code points from one code page; whereas the destination text file (15) is written with code points from another code page. The computer (11) accesses a state table library (13*a*) and executes a translate process (13*b*). A state table (25) from the library (13*a*) has rows of cells, each row being associated with a different state. Each cell contains or implies a next state and may also contain an output code point sequence. During translation, the table (25) uses a current state to select a row and uses an input code point sequence from the source text file to select a table entry. The input code point sequence is processed until an output code point is produced. For multi-byte translations, the table (25) has a cells containing a state that results in reprocessing of input code point sequences.

16 Claims, 1 Drawing Sheet

CODE POINT TRANSLATION FOR COMPUTER TEXT, USING STATE TABLES

CROSS REFERENCE TO RELATED APPLICATIONS

This application claims priority under 35 USC § 119 of provisional application Ser. No. 60/029,744 filed Nov. 8, 1996.

TECHNICAL FIELD OF THE INVENTION

The present invention relates to computer programming, and more particularly to a method of translating code points when text written with a particular character set is to be input to a computer that recognizes a different character set.

BACKGROUND OF THE INVENTION

A string of bits in a computer need not represent a number. In fact, in practical applications, most computer input and output is alphanumeric. The most common type of alphanumeric data is "text", strings of characters from a character set. Each character is represented in the computer by a binary representation according to an established convention.

A "character set" is a set of characters, each represented with an n-bit pattern of bits. "Character" is used in a general sense, in that the character set may include n-bit representations of punctuation, symbols, or any other glyph used a written language. The character set may also include n-bit representations of control codes rather than characters to be displayed or printed. For example, one character might return the print head to the first column and another might advance to the next line. The n-bit representation of a character is often referred to as its "code point".

An example of a commonly used character set is one coded in accordance with the ASCII standard. In an ASCII coded character set, each of 128 different characters is represented with a unique 7-bit string.

There are many different character sets recognized by various computer system throughout the word. Some are different because they reflect a different written language, but even a single language may have different character sets. For example, ASCII has a number of character set variations. Different character sets may use different characters for the same meaning or the same character may have different meanings. For example, the letter "A" may have one code point in one character set and a different code point in another character set. Or, the same code point value might represent "A" in one character set and "a" in another.

To input text that is written with character set to a computer that is configured to decode a different character set, some sort of translation must occur. For example, if it is desired to display an "A" coded with a source character set on a computer that recognizes a different character set, the code point for "A" in the source character set must be translated to the code point for "A" in the character set of the computer.

SUMMARY OF THE INVENTION

One aspect of the invention is a method of using a computer to translate a source text file to a destination text file. The source text file has glyphs and control codes that are represented by code points from a source code page. The destination text file has glyphs and control codes that are represented by code points from a destination code page.

The method is implemented as translate process, which uses a translation state table from a library stored in memory of the computer. The table has at least one row of cell entries, which include or imply a next state and which may include a destination code point sequence (all or part of a code point for the destination text file). Each row is associated with a different state. The columns of each row are sequentially indexed with source code point sequences (all or part of code points from the source code page).

The finite state machine defined by the translation state tables drives the translation process. When a translation state table is loaded, the current state is set to the initial state (value 1). The translate state machine runs whenever there is input available or the current state is not the initial state. When it is running, the current state selects the row that will execute. The executing row usually consumes some of the input stream (usually one byte), then uses that input to select a column. The selected column can provide output (one or more bytes) and a new current state. If no new current state is specified, the row default state becomes the new current state. Then as long as the current state is not the initial state, and some input is available, the finite state machine continues to process the row selected by the current state.

The state table can be set up for multi-byte translations. Typically, this involves translation of shift control codes, i.e., codes that indicate a shift from single-byte to multi-byte code points or vice versa. The state table will have special rows that permit a source code point sequence to be reprocessed so that it can be used to determine both the correct shift control and destination code point.

Another aspect of the invention is a method of using a computer to automatically generate the translation state table used for the above-described translation process. A generator is provided with a source code point definition file ("source definition file") and a destination code point definition file ("destination definition file"). Both files map code points to common identifiers for glyphs and control functions that the code points of both files represent. The generator reads the source definition file and matches the identifier in that file to the identifier in the destination definition file. It then uses the corresponding code point in the destination definition file as a table entry. For multi-byte translations or special cases, the generator generates special rows in the table for state changes. For example, for multi-byte translations, it reads and interprets shift control codes and generates a special row that permits an input code point sequence to be re-processed so that it can be used to index to different cells, one with a shift control value and another with a destination code point value.

An advantage of the invention is that the method works for translations from and to many different code pages. The translation intelligence is stored in a portable binary encoding. The setup for a translation involves only a description of the source and destination code points with their common identifiers.

DETAILED DESCRIPTION OF THE INVENTION

GCGIDs and Code Pages

Figure 1:
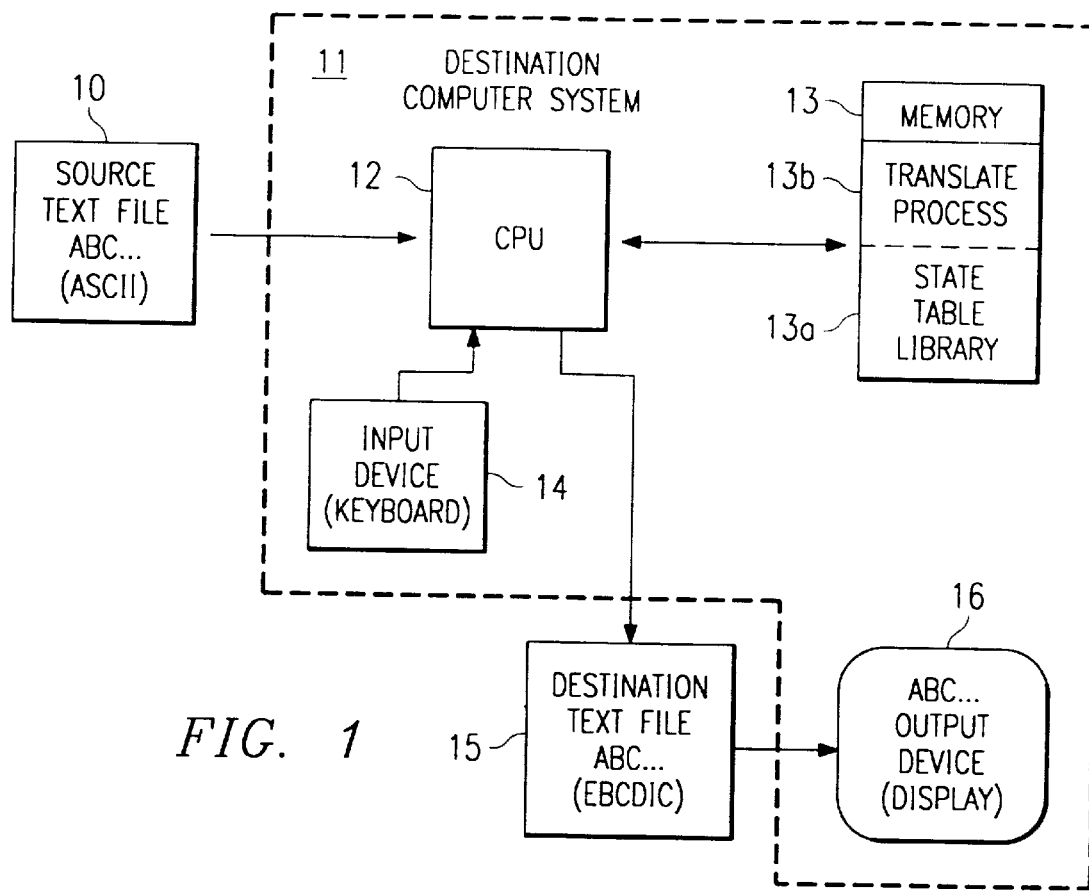
FIG. 1 illustrates a computer system programmed to translate a source text file to a destination text file in accordance with the invention.

The invention described herein is directed to translating a text file written with one character set (a source text file) to a text file written in another character set (a destination text file). The term "character set" is used in a general sense to include any set of glyphs and control codes, used to print or display text in a given language, whether English or non-English. "Glyphs" are shapes, as opposed to "fonts", which are styles of particular shapes. In other words, a glyph may be printed or displayed in a variety of fonts.

The invention involves defining character sets with code points and Graphic Character Global Identifiers (GCGIDs). GCGIDs are a feature of an existing identification method, which was developed to provide a standard for describing glyphs, independent of their character set. The GCGID method is an extension of an identification method used in many CCITT and ISO standards. Each character is assigned a GCGID, which is composed of two letters (A–Z) and six decimal digits. For example, LA020000 is the GCGID for the glyph "A".

A "code page" is a set of relationships between code points and GCGIDs for a particular character set. Each code point is a numerical index into the code page. For example, an ASCII code page includes the code points 0–127. Code points 0–31 are assigned to controls and code points 32–127 are assigned to GCGIDs. It should be understood that even within a basic encoding method, such as ASCII, there may be many variations, each having the same basic characters and variations of additional characters or controls and therefore each having a different code page.

The following table illustrates four code pages, and, for each code page, the GCGID for each of three code points.

| | code pages | | | |
|---|---|---|---|---|
| code points | 37 EBCDIC | 850 PC ASCII | 819 ISO8859-1 | 932 SJIS |
| 0x41 | (RSP) SP300000 | A LA020000 | A LA020000 | A LA020000 |
| 0x81 | a LA010000 | ü LU170000 | \<control\> \<code\> | \<first\> \<byte\> |
| 0xC1 | A LA020000 | L SF020000 | Á LA120000 | ｰ JQ700000 |

Many character sets use a relatively small number of code points. For example, the number of code points required to encode all of the letters and symbols to display the languages of the majority of people in America and Western Europe is less than two hundred. Most computers use a byte (an 8-bit unit) as the smallest addressable unit. A code page defined to fit within this single-byte size can represent a maximum of 256 code points, which is sufficient for the characters and control functions for these American and Western European languages. This type of code page is called a SBCS (Single Byte Character Set) code page.

There are several established SBCS code pages. The most widely accepted is ISO8859-1, also known as Latin-1. It provides all of the necessary code points to support the written forms of English, French, German, Spanish, Swedish, and Danish. Russian, Turkish, Greek, and other non-Latin based languages can also be supported by SBCS code pages because the total number of characters needed to represent words in these languages is sufficiently small. The Arabic and Hebrew languages can be represented with SBCS code pages, although the encoding is more complex.

Other character sets, such as those for the Chinese and Japanese languages, may have thousands of characters. These character sets require multiple bytes for each code point.

In the examples of this description, regardless of whether the character set being translated is single-byte or multi-byte, the translation process occurs one byte at a time. Thus, the translation state tables are set up for one-byte inputs, that is, for a "one-byte code point sequence". Code points having more than one byte are input and processed as a series of one-byte code point sequences. For example, a two-byte code point is input and processed twice, each time with a one-byte code point sequence. In other embodiments of the invention, the state tables could be set up so as to process code point sequences that are entire code points, regardless of whether the code point is single-byte or multi-byte.

Overview of Invention

FIG. 1 illustrates a computer system 11 programmed in accordance with the invention. Computer system 11 has a processing unit 12 with at least one processor, internal memory, and appropriate I/O (input/output) components. An example of a processing unit 12 is a personal computer, such as that manufactured by International Business Machines. A memory 13, such as a hard disk drive, stores programming executed by processing unit 12 and data operated on during program execution. An input device 14, such as a keyboard, is used to enter data. Other input devices could be used, such as voice recognition devices. Also, multiple input devices could be used, such as is usually the case with a trackball or other pointing device. An output device 15, such as a display, displays whatever user interface is appropriate for the data being entered, accessed, or operated on. As illustrated in FIG. 1, memory 13 stores a translation state table library 13a and is programmed with a translate process 13b.

One aspect of the invention is the use of computer system 11 to translate a source text file 10. Source text file 10 is written using characters from a code page, such as an ASCII code page, which computer system 11 does not recognize. For example, the "A" in the source text file 10 has a code point that would not necessarily produce an output "A" on the destination computer system 11. Computer system 11 accesses a state table from library 13b and uses the translate process 13b to create a destination text file 15, whose code points are consistent with the character set of computer system 11.

As explained herein, the translate process 13b is based on the principle of operation of a finite state machine, implemented by a state table from library 13a. Each translation of a source text file (written with code points from a source code page) to a destination text file (written with code points from a destination code page) is defined by one state table. The translate process 13b receives code points from the source text file 11 and uses the state table to provide code points for the destination text file 14.

Another aspect of the invention is the use of a computer to create state table library 13a. As explained herein, library 13b is generated from code page definition files.

Figure 2:
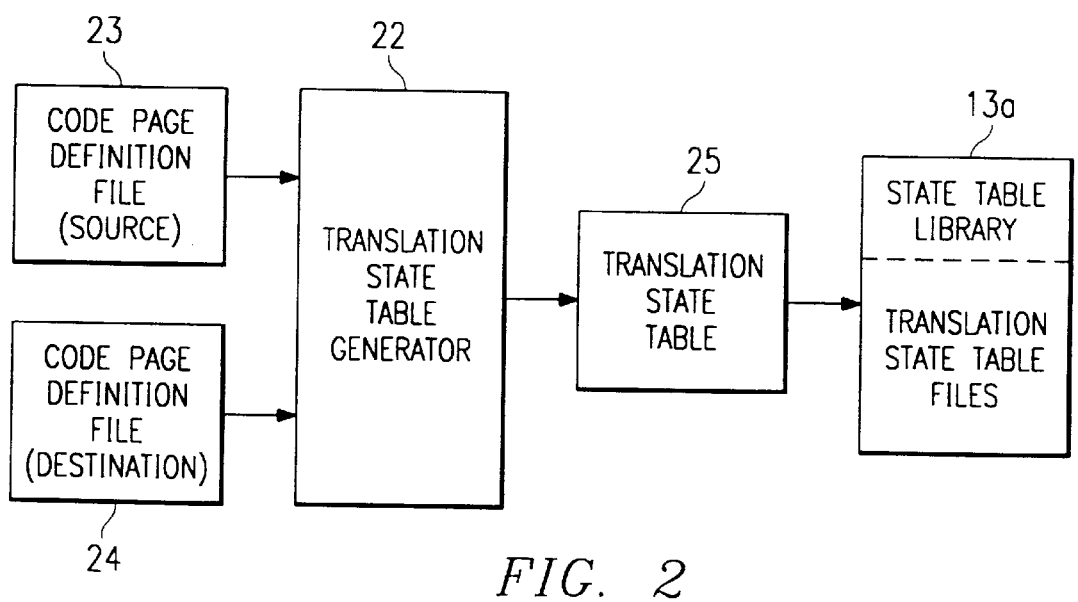
FIG. 2 illustrates the process for generating translation state tables for the library of FIG. 1.

FIG. 2 illustrates a computer process for automatically generating state tables in accordance with the invention. This process, stored in a computer memory and executed by a computer, is a state table generator 22, which receives code page definition files and creates the state tables that comprise the state table library 13a.

State table generator 22 may be executed by the destination computer system 11 or by some other computer. In other words, if state table library 13a is created on a computer different than destination computer 11, it may subsequently be read into the memory 13 of destination computer 11.

Code Page Definition Files

As illustrated in FIG. 2, the creation of each state table 25 that comprises library 13b requires a source code page definition file 23 and a destination code page definition file 24. A code page definition file is a sequential text file that lists all GCGIDs that correspond to code points of particular code page. The GCGIDs are listed in ascending code point order.

Where a code point has an existing (standard) GCGID, that GCGID is used. Other code points, such as those that correspond to control functions, are assigned "private" GCGIDs. Code points that have no defined value are left undefined in the file.

Tables from which code page definition files can be built are published in the *National Language Support Reference Manual* (SE09-8002), published by International Business Machines. This document also defines the GCGIDs, and is incorporated herein by reference.

The first line in a code page definition file is a header that contains information about the file. An example of a header is as follows:

! IBMPC Code Page 437 (american PC)

The "!" indicates that the line is a header. "IBMPC" is a key word indicating the type of code page. Examples of other code page types are ISO, EUC, EBCDIC, and UNICODE. "437" is the code page number, and "american PC" is the vendor, CCITT, or ISO name for the code page.

After the header, the code page definition file is comprised of lines of code points and GCGIDs. Code point numbers begin in the first column of a line and are encoded as decimal or hexadecimal strings terminated by a space or tab. GCGIDs are preceded and followed by a white space (one or more space or tab characters).

An example of a line of a code page definition file is as follows:

0x20 SP01 SP02 SP04 SM01 SC03 SM02 Each word following the code point is a GCGID, with trailing zeros omitted. Each GCGID identifies the character for one code point and increments the code point value. In the above example, code point 32 (0x20) has a GCGID of SP01000 and code point 33 (0x21) has a GCGID of SP020000. If a code point is omitted in the first column, the current code point value after the previous line will be used.

The same code point can have more than one GCGID. If so, an equivalence indicator (=) is used. An example of a line defining code points having multiple GCGIDs is as follows:

0x3C SF24=SM54 SF06=LS21 SF01=SP28 zzeot In the preceding example, code point 0x3C can be either SF240000 or SM5400000 depending on the table with which the code point is paired when generating the translate state table. This permits translations that ignore minor incompatibilities of code pages in favor of forcing a one-to-one translation. For example, Code Page 437 and Code Page 850 have 32 GCGIDs that are different. By using the equivalence indicator in the definition of Code Page 437, these differences can be ignored and assigned a common code point.

As stated above, code pages having multi-byte code points are characterized by shift control codes. These shift control codes indicate a shift from single-byte code points to double-byte code points or vice versa. Examples are the code pages for the SJIS (Shift Japanese Industrial Standard), EUC (Extended UNIX Character), and SOSI (Shift-Out, Shift-In). For these code pages, the definition file uses a ">" character to indicate shift control codes. Both locking-shift codes and single-shift codes can be encoded in the definition file.

The general form of the shift control code in the definition file is:

[>, number of bytes, I or S]

An "S" represents a locking-shift code (such as shift-out and shift-in). An "I" represents the first byte of a single-shift code point sequence. This first byte can be either the EUC single-shift codes or the first byte of a multi-byte word.

For locking-shift codes, the number between the ">" and the "S" is the number of bytes in the code point after decoding the locking shift control code. The following example defines code point 0x0E as shift-out (from 1 byte to 2 bytes) and 0x0F as shift-in (from 2 bytes to 1 byte):

0x0C zzff zzcr >2S >1S

For single-shift code point sequences (including the first byte of a multi-byte word), the number between the ">" and the "I" is the number of bytes in the code point including the single-shift byte. The following example shows the encoding of the first three words in a SJIS (Shift Japanese Industrial Standard) code page:

0x80 CS04 >2I >2I >2I

In the preceding example, code point 0x80 is SC04000, but code points 0x81, 0x82, and 0x83 are each the first byte of a two-byte code point, that is, 0x81??, 0x82??, and 0x83??, respectively.

An example of a portion of a definition file for code points having multi-byte sequences follows. The code points are from SJIS encoding and the GCGIDs include "private" GCGIDs for representing Japanese glyphs.

| 0x8168 | jis00608 | jis00609 | jis00610 | jis00611 |
| 0x8258 | jix01010 | jix01021 | jix01234 | jix01121 |
| 0x8341 | jis00101 | jis00123 | jis00998 | jis00999 |

Like the single-byte code page definition files, the number in the first column is a code point value, which can be either decimal or hexadecimal. The maximum code point value is $2^{32} - 1$ (4,294,967,295). All single shift code points include the shift byte as the first 8 bits of their code point value.

Translation State Table Generator

As illustrated in FIG. 2, the translation state table generator 22 reads a source code page definition file 23 ("source definition file") and a destination code page definition file ("destination definition file") 24 to produce a translation state table file 25. This file 25 consists of a header row and state rows that define the translation process for a specific pair of code pages.

Each invocation of the generator 22 generates one translation state table file 25. Thus, to generate an isometric pair of translation state table files 25, generator 22 is called twice, the second time with the previous source definition file as the destination definition file and the previous destination definition file as the source definition file.

In operation, the generator 22 first opens both the source and destination definition files 24 and 25. It reads the header from each file and extracts the encoding style, the code page identifier, and the ISO name of the encoding. The extracted information is used to create a header row for the table file 25. Specifically, the two header lines are concatenated together to make the Description field, and the two code page identifiers are converted to an eight-character alphabetic file name.

Next, generator 22 reads the destination definition file 24 and builds a temporary table of all GCGIDs of that file 24 with the associated code point for each GCGID. If a line from file 24 begins with a code point number, it is read and used to build the temporary table.

For each next line of file 24, if the new code point is greater than the current code point value, a warning is issued that some code points have been skipped and the current code point is set to the new code point. If the new code point is less than the current code point value, an error is issued indicated that some code points have been duplicated, and the generation stops. When the new code point is equal to the current code point, processing continues.

All alpha-numeric strings in the line, up to a comment or end-of-line are treated as GCGIDs. A table entry is built for each GCGID, and contains the code point value and the GCGID. If a duplicate GCGID is detected, processing terminates with an error. If the GCGID is terminated with a white space, the code point value is incremented. If the GCGID is followed by an "=" sign, the code point value remains the same and the next GCGID is processed.

For code points that represent shift controls, generator 22 creates a temporary shift table. Thus, when a code point starts with ">", a shift table entry is built for that code point. The type of shift (locking or single) and other information about the code point are indicated in the shift state table.

When all of destination definition file 24 has been processed in the above-described manner, the input phase is completed. The data that was in string form in the destination file is now in the form of a destination code point table.

During the next phase of table generation, generator 22 reads the source definition file 23 and builds the translation state table for file 25. Initially, the current code point value is zero. The processing of the source definition file 23 is line-by-line, similar to the processing of the destination definition file 24. However, when processing the source code points, the GCGID of each source code point is used to look up the corresponding code point in the destination code point table. The code point is used to create an entry in the state table of file 25. If a code point does not exist in the destination code point table, a warning is generated, and a default code point value is placed in the state table.

State table entries can be destination code points or new state values, or both. For example, translation of a shift control code point sequence might require the use of two rows in the state table. Thus, when generator 22 encounters such a code point sequence, it might first create a table entry for the control code, then a state change, then a table entry in another row for a code point output. The shift table created during the input phase is used to reference the appropriate state and thus the appropriate state row. Other state changes may be the result of encountering code point that represent flags.

When the table building phase is completed, generator 22 checks the destination GCGIDs for any unused characters and produces a warning for each one, if any.

Next, the generator 22 creates a file 25 for the newly created state table, and writes the file header. Each row of the state table is written into the translation state table file 25. Before the row is written, the space it uses in table is computed, and InputMinimum and InputMaximum parameters (as defined below) are set to appropriate values. Unused space at the end of the row is removed. All integers (long or short) are converted into most significant byte first format. Then the row is written into the state table file 25 in order of its associated state number. All rows are stored as a binary file 25.

After all rows have been written, the number of rows is updated in the state table header, and the header is rewritten to the translation state table file 25.

The translation state table generator 22 writes the translation state table file 25 into library 13a. Finally, all files are closed and generator 22 terminates.

Translation State Tables

Referring again to FIG. 1, library 13a contains one file for each translation state table 25. The name of library 13a may be specific to the computer system 11. However, the names of the files in the library 13a are independent of the computer system 11. As described above in connection with generator 22, each file name is a string of eight characters derived from the source and destination code page numbers.

Each translation state table in library 13a is a finite state machine structure stored in memory of computer 11, which when used by the translation process 13b, describes code point translation from one code page to another.

Each table has a header row and one or more translation rows. When there are 1 . . . n rows, the rows each have a state, S1 . . . Sn, respectively. Some translation tables, such as those used for translating Arabic or Japanese can have more than a hundred rows, each row representing a different state.

The first row in the table 25 is a header row. An example of the header structure is:

| | | |
|---|---|---|
| unsigned char | Type | value 0xFF identifies this format |
| unsigned char | Flag | zero reserved |
| short | OneTwo | byte swap flag value 0x0102 |
| short | source CPID | source code page number |
| short | destination CPID | destination code page number |
| short | StateCount | number of state rows |
| char | SourceName | name of source system |
| char | DestinaName | name of destination system |
| char | description | free format description |

The value of OneTwo determines whether short and long integers are to be byte swapped. If OneTwo is equal to 0x0102, integers are in the correct order. If OneTwo is equal to 0x0201, all integers must be byte swapped. SourceCPID and DestinationCPID are used to verify that the correct file from library 13a has been opened using the constructed file name. StateCount is the same as the number of rows in the table (other than the header row). SourceName, DestinationName, and Description are comments, which permit someone browsing library 13a to determine the nature of each file.

Apart from the header row, the remaining row(s) of a translation state table provide header information and cell values.

The row header describes the type of row and other parameters. All rows have the common parameters of state number, row type, flags, input byte count, and output byte count. Other elements are determined by the type of row. The input byte count (InputWidth) specifies the number of bytes from the input string that are consumed by the row. The output byte count (OutputWidth) specifies the number of bytes of output that can be produced by the row. When the fields InputMinimum and InputMaximum are present in the header, the input is tested to ensure that it is valid (greater than or equal to InputMinimum and less than or equal to InputMaximum plus InputMinimum).

In the example of this description, a table may have one or more of six different type of rows. These row types vary depending on the type of output their cells contain. Four row types provide output specified by a Table parameter. Each output is contained in a cell having a specific cell type.

There are several different cell types. A first cell type is of cells containing a single output byte used for single-byte to single-byte translations.

Another cell type, identified as XSTE2, has the following structure:

| unsigned char | Output [2] | next state or output byte(s) |
|---|---|---|

When OutputWidth is two, a cell of this type provides two bytes of output, unless both bytes are zero. When OutputWidth is one, and the first byte of the cell is XSF_Mixstate, the second byte is the output. Otherwise, the two bytes are taken as the next state value, most significant byte first.

Another cell type, XSTE3, has the following structure:

| short | NextState | next state value |
|---|---|---|
| unsigned char | Output [4] | output byte(s) |

When NextState is not zero, it is the next state value for this cell. The output is the OutputWidth right justified bytes of the Output string.

Another cell type, XSTE4, has the following structure:

| unsigned char | Output [4] | next state or output byte(s) |
|---|---|---|

When OutputWidth is 4, XSTE4 provides 4 bytes of output, unless all bytes are 0. When OutputWidth is less than 4 and the first byte of XSTE4 is equal to XSF_Mixstate, the right-justified OutputWidth bytes are the cell output. Otherwise, the first and second bytes are taken as the next state value (most significant byte first).

Two other row types are used for special processing. As explained below, one row type permits an input to be reprocessed, and another provides a validation table.

With regard to specific row types, a first row type, RowType0, is used to translate code pages that represent each code point with one byte. In this type of translation, one byte in the source text is translated to one byte in the destination text. The following is an example of the structure of RowType 0:

| unsigned char | Type | 0 identities this row type |
|---|---|---|
| unsigned char | Flag | 0 indicates no flags defined |
| unsigned char | InputWidth | 1 is single byte input |
| unsigned char | OutputWidth | 1 is single byte output |
| unsigned char | Table [256] | full byte for table |

Table is an array of 256 bytes of destination code point values. Each of these values is at the corresponding source code point index into the table. No input is out of range in this table, so no testing of minimum or maximum is needed. The next state is always the current state and processing proceeds through the input code points, consuming one byte and producing one byte until all input is exhausted.

A second row type, RowType1, permits a code point sequence in the source string to be reprocessed in different row. Specifically, it controls the pointer that is used to access the input string and causes this pointer to be backed up. The code point sequence is then reprocessed with a different state row. The following is an example of the structure of Row-Type1:

| unsigned char | Type | 1 identifies this row type |
|---|---|---|
| unsigned char | Flag | XSF_Backup input pointer |
| unsigned char | InputWidth | value 0,1,2,4 |
| unsigned char | OutputWidth | value 0,1,2,4 |
| unsigned char | State | next state |
| unsigned char | Output [4] | output string |

InputWidth specifies the number of bytes that should be reprocessed. State specifies the next state. After the pointer is backed up, control transfers to the next state and processing continues. If any output is needed from this state, OutputWidth specifies the number of bytes to place in the output string.

A third row type, RowType2, defines a table consisting of output bytes or next state values for each valid input value. The following is an example of the structure of RowType2:

| unsigned char | Type | 2 identifies this row type |
|---|---|---|
| unsigned char | Flag | 0 reserved |
| unsigned char | InputWidth | value 1 only |
| unsigned char | OutputWidth | value 1 or 2 |
| short | InputMinimum | value of lowest table entry |
| short | InputMaximum | value of largest entry minus lowest entry |
| XSTE3 | Default | state to use if out of range |
| XSTE2 | Table [?] | 0 . . . InputMaximum |

Default includes both a next state value and an output byte sequence. When an input is not valid, Default provides the next state value and/or output value. If OutputWidth is 1, Table is a structure whose cells contain either a next state value or an output byte. If the first byte of Table is equal to XSF_Mixstate, then the second byte is an output byte and the state number is not changed. Otherwise, the first byte is the most significant 7 bits of the new state number, the second byte is the 8 next bits of the new state number, and no output is produced. If OutputWidth is 2, Table consists of a two-byte output sequence and the new state number is taken from Default.

A fourth type of state table row, RowType3, is the same as RowType2, except that each cell can provide both an output and a new state. RowType3 has the following structure:

| unsigned char | Type | 3 identifies this row type |
|---|---|---|
| unsigned char | Flag | processing options |
| unsigned char | InputWidth | value 1 only |
| unsigned char | OutputWidth | value 1 or 2 |
| short | InputMinimum | value of lowest table entry |
| short | InputMaximum | value of largest entry minus lowest entry |
| XSTE3 | Default | state and output |
| XSTE3 | Table [?] | 0 . . . InputMaximum |

The Default state and output are used for all input values that are outside the range. Table is an array. The input value minus InputMinimum is used as an index to the proper table value.

A fifth type of row, RowType4, defines a table of output values or new states for each valid input value. This row type is the same as RowType2 except that the possible output for each input value is two, three, or four bytes. RowType5 has the following structure:

| unsigned char | Type | 4 identifies this row type |
|---|---|---|
| unsigned char | Flag | processing options |
| unsigned char | InputWidth | value 1 only |
| unsigned char | OutputWidth | value 2, 3, or 4 |
| short | InputMinimum | value of lowest table entry |
| short | InputMaximum | value of largest entry minus lowest entry |
| XSTE3 | Default | state to use if out of range |
| XSTE4 | Table [?] | 0 . . . InputMaximum |

The Default state and output are used for invalid input values. If OutputWidth is less than 4, Table is a structure that consists of either a new state number or an output sequence. If the first byte of Table is XST_Mixstate, then the rest of the bytes are the right-justified output byte sequence and the state number is not changed. Otherwise, the first byte is the most significant 7 bits of the new state number, the second byte is the next 8 bits of the new state number, and no output is produced. If OutputWidth is 4, Table consists of a four-byte output sequence and the new state number is taken from Default.

A sixth type of row, RowType5, defines an input validation table of output values or next states for each valid input value. A default state and output are used for invalid input values. RowType5 has the following structure:

| unsigned char | Type | 5 identifies this row type |
|---|---|---|
| unsigned char | Flag | processing options |
| unsigned char | InputWidth | value 1 or 2 |
| unsigned char | OutputWidth | value 0, 1, or 2 |
| short | InputMinimum | value of lowest table entry |
| short | InputMaximum | value of largest entry minus lowest entry |
| XSTE3 | Default | state to use if out of range or table bit is 0 |
| XSTE3 | TrueOut | state used if table bit is 1 |
| unsigned char | Btable [?] | table of bits, one per valid input value |

Btable is an array of bits [0 . . . InputMaximum], one bit corresponding to each valid input value. The array is indexed by the input value minus InputMinimum. When the input is valid and the corresponding bit is one, TrueOut provides the new state number and output value.

Translation Process

Referring again to FIG. 1, the translation process 13b uses a translation state table 25 from the translation state table library 13a to perform a code page translation. The source text file 23 is not modified or overwritten, rather a new destination file 24 is created. It is assumed that buffer space for the destination text string has been allocated prior to invoking the translate process 13b and the buffer parameters passed to the translate process 13b.

The translate process 13b may be implemented with an applications interface in a programming language appropriate for the operation system of the destination computer 11. For example, PL/1 or assembler may be used for MVS operating systems. The C language or C linkage from C++ may be used for UNIX, OS/2 or DOS operating systems.

The translate process 13b has open functions, translate functions, and close functions. A general description of the functions is set out below.

The translate process 13b uses an open function to convert the source and destination code page numbers to a file name. It then locates the file with that name in the translation state table library 13a, allocates space in active memory for the translation state table in the located file, then copies the table into that memory space. It checks the byte swap flag in the table header, and if necessary, applies a byte swap algorithm.

The translate process 13b uses translate functions to translate code points of the source string to the code points of the destination string, using the referenced translation state table. The translate function initializes the state value to 1 at the beginning of each translation. Then it loops through the rows of the state table until all input is consumed and the appropriate output is produced.

During operation of the translate function, the state table acts as a finite state machine, driven with the code points of the source code page. Each row in a table has a column corresponding to every expected input for that state. The column contains (or implies) a next state value and may also contain an output code point. The current state selects the row, and the input selects the column within that row, thereby selecting a cell. The cell contains or implies a next state, which is used to update the current state. The cell may also contain an output code point sequence.

As indicated in the preceding paragraph, a cell may either contain (explicitly set) a next state or it may imply a next state. When a cell in a row does not contain a next state, the default next state for that row becomes the next state.

For each input, the associated state is executed interpretively. Referring to the row parameters discussed above, a state first performs any input indicated by InputWidth and Flag. When necessary, the input is verified to be valid, i.e., within the range specified by InputMinimum and InputMaximum. If the input is valid, the input is used to index to the next state and output, if any, in the state table. If the input is invalid, next state and output specified by Default are assigned. The process then loops back, checks for more input, and processes the next state.

For single-byte to single-byte translations, the state machine is implemented with a single-row state table. The rows are of RoWType0. The cells contain a single-byte output that is a complete code point. The new state is always the current state. Every input code point is valid and produces an output code point. Processing stops when there is no more input.

To following portion of a state table can be used to illustrate single-byte to single-byte translations. This example is a portion of the 256-entry row of the state table that translates Code Page 850 to Code Page 37. The example begins at input value 0x20, and the state is always S1:

| | input | | | | | |
|---|---|---|---|---|---|---|
| state | 0x20 | 0x21 | 0x22 | 0x23 | 0x24 | 0x25 |
| S1 | 0x40 | 0x5A | 0x7F | 0x7B | 0x5B | 0x6C |

The following input and output streams illustrate the results of a translation using the preceding state table:

| input:  | 0x22 | 0x24 | 0x25 | 0x23 | 0x21 |
|---------|------|------|------|------|------|
| output: | 0x7F | 0x5B | 0x6C | 0x7B | 0x5A |

Translation of multi-byte strings requires state tables with multiple rows. Each input value is a 1-byte code point sequence. Each input may cause either a state change or produce an output. The output may be either one or two bytes.

The following example illustrates a portion of a table for translating multi-byte code points to multi-byte code points, specifically, from SJIS to EUC. The table has rows of RowType2 and cells of type XSTE2. Each row has a different state number, S1, S2 . . . Each row of the translation table has many columns, but in the following example, only columns 0x9C–0xA2 are shown. All output values are either next states (S1, S2 . . . ) or two-byte code point sequences. The initial state is S1. Whenever a code point output is produced, the current state is reset to S1.

| | | | input | | | |
|---|---|---|---|---|---|---|
| state | 0x9C | 0x9D | 0x9E | 0x9F | 0xA0 | 0xA1 | 0xA2 |
| S1 | S2 | S3 | S4 | S5 | 8EA0 | 8EA1 | 8EA2 |
| S2 | D7FC | D7FD | D7FE | D8A1 | D8A2 | D8A3 | D8A4 |
| S3 | D9FC | D9FD | D9FE | DAA1 | DAA2 | DAA3 | DAA4 |
| S4 | DBFC | DBFD | DBFE | DCA1 | DCA2 | DCA3 | DCA4 |

The following input and output streams illustrate the results of a translation using the preceding state table:

| input:  | 0x9C | 0xA0 | 0x9E | 0xA1 | 0x9D | 0xA1  | 0xA2  |
|---------|------|------|------|------|------|-------|-------|
| state:  | S2   | S1   | S4   | S1   | S3   | S1    | S1    |
| output: | **   | D8A2 | **   | DCA3 | **   | *8EA1 | *8EA3 |

When the input causes a state change, no output is produced, as indicated by "**". When an output is produced, the current state returns to "S1".

In the preceding example, RowType 3 or 4 could be substituted for RowType2, depending on the nature of the translation and the desired output.

Typically, a table used for multi-byte translations will use a RowType1 to permit the first byte of a shift sequence to be reprocessed. For example, when the source text is written with a Japanese PC code page, a first byte of a code point might be a single-shift byte, indicating that the character has two bytes. The cell value would be a new state, whose associated row provides an EBCDIC locking shift code and a next state. This next state would cause another state change, whose associated row is of RowType1. This new row would reprocess the input byte and provide either a new state or an output representing the code point to be printed.

The following example illustrates a portion of a table for translating multi-byte code points, where rows of RowType1 and RowType5 are used. The translation is from Arabic PC to Arabic EBCDIC. Arabic encoding and translation is unique in that the translation of one byte in a given code page depends on the preceding and following bytes. The translate state tables must use extra rows to remember preceding conditions of translation, and conditional rows to make decisions for the current character by examining the following character.

The portion of the state table containing rows of RowType2 is as follows. This portion begins with input code point 0xC8.

| | | | input | | | |
|---|---|---|---|---|---|---|
| state | 0xC8 | 0xC9 | 0xCA | 0xCB | 0xCC | 0xCD |
| S1 | S29 | 62 | S32 | S34 | S36 | S38 |
| S3 | S28 | S30 | S31 | S33 | S35 | S37 |

A portion of the same table, illustrating rows of RowType 1 and RowType5 is as follows:

| input state | row type | state:output default | true state output | map |
|---|---|---|---|---|
| S2  | 1 | S1:[IN-1] | ** | ** |
| S4  | 1 | S3:[IN-1] | ** | ** |
| S28 | 5 | S2:58 | S4:59 | 3B24F7002E7FF . . . |
| S29 | 5 | S2:5A | S4:5B | 3B24F7002E7FF . . . |
| S30 | 1 | S1:62 | ** | ** |
| S32 | 5 | S3:61 | S4:5C | 3B24F7002E7FF . . . |

When the output causes a state change, no output is produced as indicated by **. When an output is produced, the current state returns to S1.

Using the above table, an example of input and output strings is:

| | | | current state | | | |
|---|---|---|---|---|---|---|
| | S1 | S29 | S4 | S3 | S32 | S4 |
| input  | 0xC8 | 0xCA | ** | 0xCA | 0xC9 | ** |
| state  | S29  | S4   | S3 | S32  | S4   | S3 |
| output | **   | 5B   | IN-1 | ** | 5C | IN-1 |

In the above example, for rows of RowType1, IN-1 means that the input byte pointer is backed up once, which causes the next state to reprocess the previous byte of input. The rows of RowType5 provide a map to indicate either a true or false condition. In the example, the location in the map of state S29 corresponding to 5B was true, thus the new state is S4 and the output is 5B. In the example, the actual input string is C8 CA C9. Because of conditional row types (RowType1 and RowType5), some bytes are reprocessed and many more states are used than in the other examples set out above.

For all translations, if more output is produced than will fit into the destination string area, the output is truncated at the end of the destination buffer. Input processing continues until all input is used. Although the length of the translated string is longer than the destination buffer, no output is placed in the buffer past the output area length. To recover the output, a new destination buffer the actual length of the translated string is allocated and the translation applied to the source string again.

When a translation state table is no longer needed in active memory, a close function releases the memory. After a close, the handle is cleared.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a computer to translate a source text whose glyphs and control codes are represented by a string of code points from a set of source code points to a destination text whose glyphs and control codes are represented by a string of code points from a set of destination code points, comprising the steps of:

accessing a translation state table, said translation state table having at least one row of cells, each said row having an associated state value, and said cells being indexed by said source code points;

using a current state to select a row of said translation state table;

using an input code point sequence from said source text to select a cell within said row;

if said cell contains a next state value, repeating said steps of using said current state and of using an input code point sequence until a desired destination code point sequence is provided;

updating said current state with a next state value;

repeating said steps of using a current state, using an input code point sequence, and repeating, for each next input code point sequence.

2. The method of claim 1, wherein said step of repeating said steps of using said current state and of using an input code point sequence is repeated until said cell contains a destination code point sequence and does not contain a next state.

3. The method of claim 1, wherein said updating step is performed with a next state implied by said cell.

4. The method of claim 1, wherein said table represents translation of single-byte code points to single-byte code points, and wherein said cells contain said destination code points, and where in said next state is the current state.

5. The method of claim 1, wherein said table represents translation of multi-byte code points to multi-byte code points, wherein said table has at least one row whose cells contain either a destination code point sequence or a next state.

6. The method of claim 1, wherein said table represents translation of multi-byte code points to multi-byte code points, and wherein said table has at least one row whose cells result in re-processing of said input code point sequence.

7. The method of claim 1, wherein said table represents translation of multi-byte code points to multi-byte code points, and wherein said table has at least one row whose cells contain both a destination code point sequence and a next state.

8. The method of claim 1, wherein said table represents translation of multi-byte code points to multi-byte code points, and wherein said table has at least one row that maps each input code point sequence to a true or false value thereby providing for a conditional destination code point sequence.

9. The method of claim 1, wherein said input code point sequence is a single byte of a multi-byte code point.

10. The method of claim 1, wherein said input code point sequence is an entire multi-byte code point.

11. A method of generating a state table for use in translating a source text whose glyphs and control codes are represented by a string of code points from a set of source code points to a destination text whose glyphs and control codes are represented by a string of code points from a set of destination code points, comprising the steps of:

assigning a common identifier to gylphs and control codes used in both said source text and said destination text;

creating a source code page definition file containing each source code point and its associated common identifier;

creating a destination code page definition file containing each destination code point and its associated common identifier;

reading a source code point in said source code page definition file and using said common identifier to locate a destination code point in said destination code page definition file, thereby locating a table entry for said source code point, wherein said table entry may represent either a state value or an output destination code point sequence;

determining a row of said table in which to place said table entry, said row having an associated state;

placing said table entry in said row; and repeating said steps of reading, determining, and placing for each of said source code points.

12. The method of claim 11, wherein said step of determining a row is performed by placing said table entry in a row whose cells contain said destination code points, and wherein said next state is the current state.

13. The method of claim 11, wherein said step of determining a row is performed by placing said table entry in a row whose cells contain either a destination code point sequence or a next state.

14. The method of claim 11, wherein said step of determining a row is performed by placing said table entry in a row whose cells result in re-processing of said input code point sequence.

15. The method of claim 11, wherein said step of determining a row is performed by placing said table entry in a row whose cells contain both a destination code point sequence and a next state.

16. The method of claim 11, wherein said step of determining a row is performed by placing said table entry in a row that maps each input code point sequence to a true or false value thereby providing for a conditional destination code point sequence.

* * * * *